April 29, 1930.  E. D. MOORE  1,756,656
CIRCUIT BREAKER
Filed April 17, 1926   3 Sheets-Sheet 1

Inventor
Edgar D. Moore
By
Attys.

April 29, 1930.   E. D. MOORE   1,756,656
CIRCUIT BREAKER
Filed April 17, 1926   3 Sheets-Sheet 2

Inventor
EDGAR D. MOORE
By
Attys.

April 29, 1930. E. D. MOORE 1,756,656
CIRCUIT BREAKER
Filed April 17, 1926  3 Sheets-Sheet 3
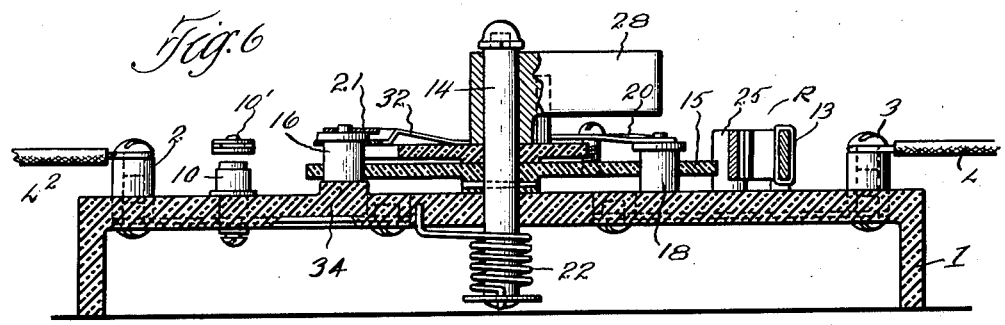
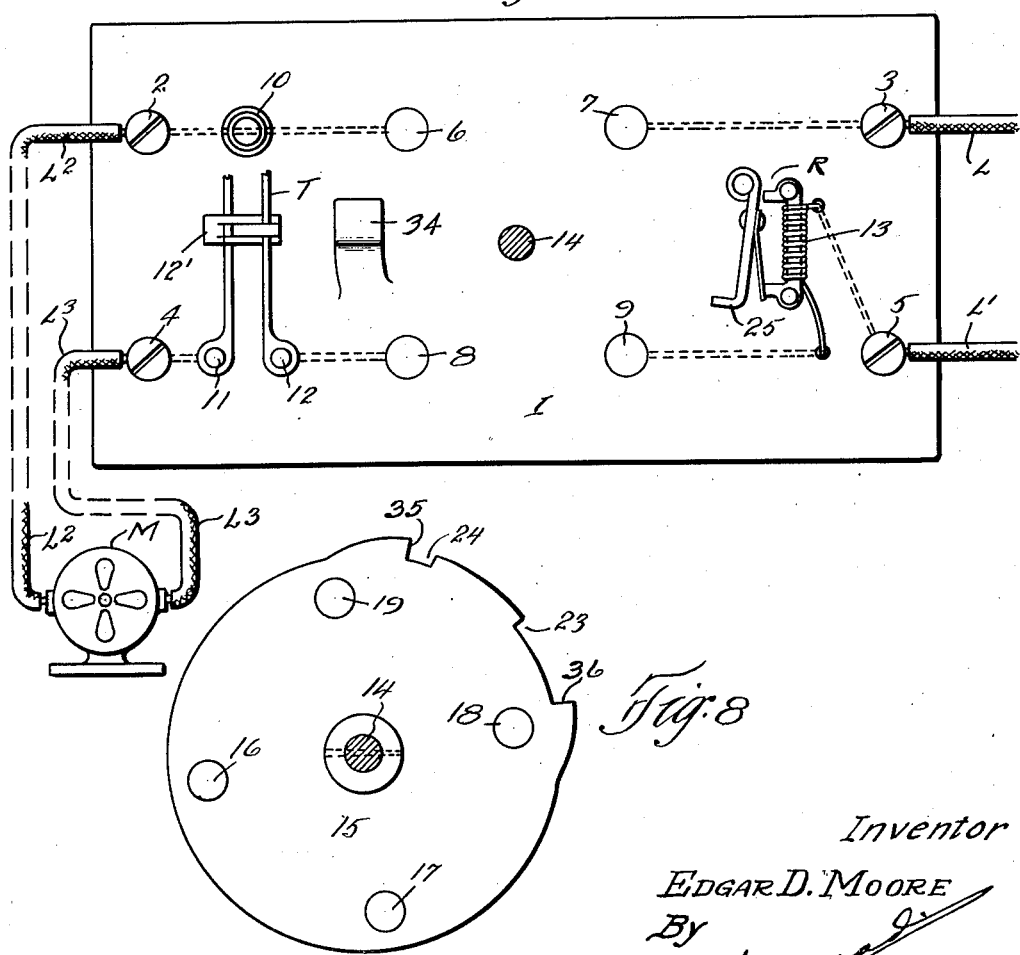
Inventor
EDGAR D. MOORE
By
Attys.

Patented Apr. 29, 1930

1,756,656

UNITED STATES PATENT OFFICE

EDGAR D. MOORE, CLEVELAND, OHIO, ASSIGNOR TO THE OHIO BRASS COMPANY, OF MANSFIELD, OHIO, A CORPORATION OF NEW JERSEY

CIRCUIT BREAKER

Application filed April 17, 1926. Serial No. 102,653.

This invention relates to circuit opening devices and has particular reference to automatic switches or circuit breakers which are adapted as a substitute for the ordinary fuses now in use.

The purpose of the switch is twofold; first, to offer protection to fractional horse power motors and second, as a combined junction box, switch and protective device in the house, either replacing the fuse or protecting the same.

As a specific example of the above statements, it might be pointed out that A. C. fractional horse power motors start by means of a starting winding which is thrown out in most cases by centrifugal force acting on the brushes when the motor reaches normal speed. If for any reason the motor does not reach normal speed within the time intended by the manufacturer this winding will be injured by the excessive heat. In the case of a washing machine using such a motor if the motor is slowed down or stalled by its load these brushes will drop back in, causing the starting winding to burn out. Often a motor is stalled by clothes getting caught in the wringer. If the circuit is not broken immediately either a burned out motor or a blown fuse is the result. In some cases the fuse does not offer protection, as a 15 ampere fuse in a house allows the motor to work on a 500% overload. A fuse less than that will not start the motor. My improved switch is built and adjusted to prevent a burning out of the starting winding due to either a stalling of the motor or an overloading. It allows the motor to deliver its overload rating breaking the circuit when the overload has been carried as long as it is safe. Should a person while operating the washing machine get caught in the wringer, the extra load thrown upon the motor would be sufficient to trip the switch, thereby offering a safety feature. This switch installed upon a washing machine or other apparatus prevents blowing of a fuse, doing away with a nuisance familiar to every operator of washing machines.

My improved switch may be used with any installation which calls for some kind of automatic protection; for example, the butt welding machines where two pieces to be welded are forced together with a motor. These motors are often times burnt out because the switch has not opened soon enough. Also conveyor belts in candy and food packing plants become gummed from the products of manufacture thereby throwing over-loads on the motor which finally causes its destruction. In installing in a home it may be used as a substitute for the fuse or as a device preventing fuse burn-outs and eliminating the abuses and nuisances which accompany the fuse.

Some of the advantages accruing from my improved switch are as follows: First, it breaks both sides of the circuit, cutting the circuit off complete at the switch. It is a combined electro and thermo responsive controlled switch. It has a certain range of values of amperes for which it allows a time element. For all values above this it breaks instantaneously. It opens the circuit at a multiple of points simultaneously thereby reducing the current broken at any one contact and giving it very high arc quenching values. This makes it impossible to carry an arc under any normal conditions. It uses carbon or metallized carbon (which has a very low resistance compared with carbon only) brushes on copper contacts which electric motor practice has shown to be the best to resist pitting, preventing "freezing" and assuring good contact. It breaks free of the handle, or, in other words, it is impossible to hold the switch by the handle in a closed position when a permanent short exists in the line that is being protected by my switch. It is readily adjusted for different ampere values without a change in parts. It has a definite "on" and "off" position similar to an automobile ignition handle so that an operator can tell at a glance which circuit is "off" and what is necessary to put it "on." Another advantage of my construction is that nearly all of its parts can be made on a punch press or screw machine and the device is well adapted for quantity production at comparatively low cost.

In the drawings forming a part of this application:

Fig. 6 is a longitudinal sectional view on the lines 6—6 of Fig. 3.

Fig. 7 is a horizontal sectional view on the line 7—7 of Fig. 2, looking in the direction of the arrows, and in addition shows my invention connected to a translating device M.

Fig. 8 is a view similar to Fig. 7 taken on the line 8—8 of Fig. 2, looking in the direction of the arrows.

Figure 1:
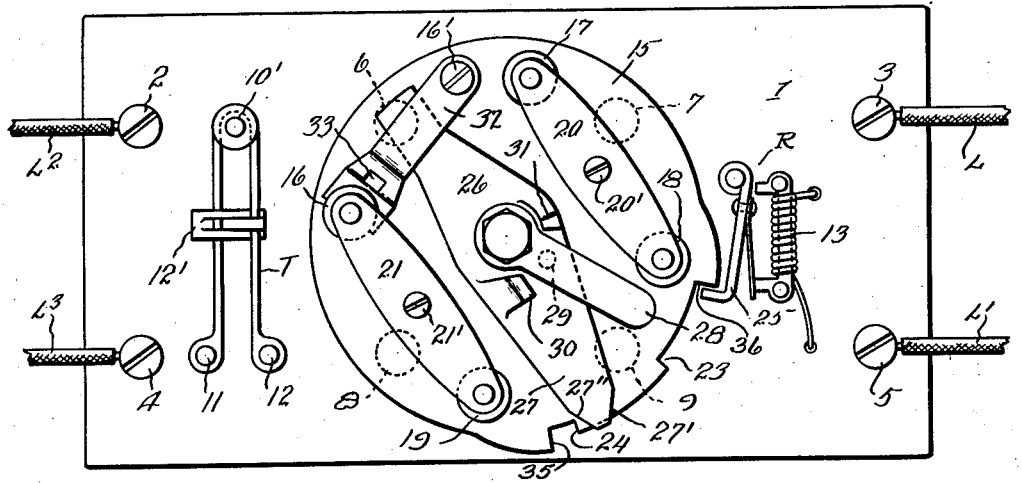
Fig. 1 is a plan view of my improved circuit breaker showing the same in the "off" position.
Figure 2:
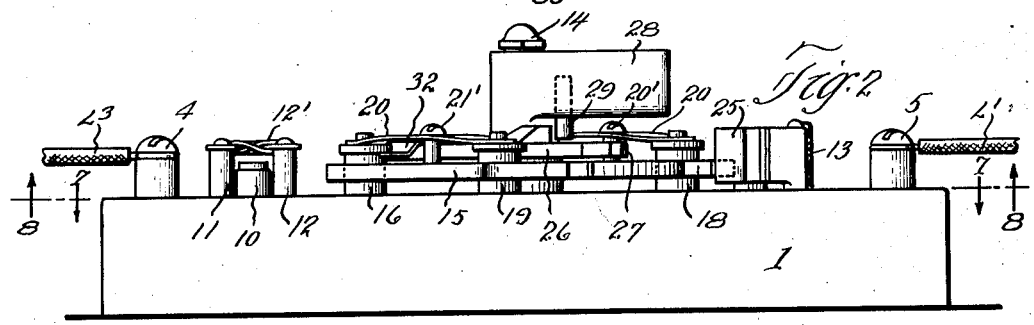
Fig. 2 is a side elevation of Fig. 1.

In carrying out my invention I provide a base member 1 of insulating material with metallic binding posts 2, 3, 4 and 5. The base member 1 is also provided with spaced contacts 6, 7, 8 and 9 rigidly secured to the base and electrically connected with the posts 2, 3, 4 and 5. Interposed in the circuit between the post 2 and contact 6 is a contact post 10 and between the post 4 and contact 8 are a pair of posts 11 and 12, the purpose of which will hereinafter appear. Secured to the upper side of the base member and interposed in the circuit between the contact 9 and post 5 is an electro-responsive trip R. Fixedly mounted on a pin 14 secured in the base member 1 is a flat substantially cylindrical plate 15 of insulating material, and this plate is provided with contacts 16, 17, 18 and 19 resiliently mounted therein. A metallic spring arm 20 connects the contacts 17 and 18 and a metallic spring arm 21 connects the contacts 16 and 19 and screws 20' and 21' connect said arms 20 and 21 with the plate 15. The screws 20' and 21' may be adjusted to vary the tension of the spring arms 20 and 21 respectively, so as to maintain the contacts 16, 17, 18 and 19 in resilient frictional sliding engagement with the base member 1.

Figure 10:
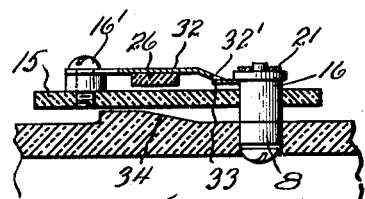
Fig. 10 is a sectional view on the line 10—10 of Fig. 5.

A coil spring 22 connected at one end to the pin 14 and at the opposite end to the base member 1 normally maintains the plate in the position shown in Fig. 1. The plate 15 is provided on its periphery with a stop 23 and a stop 24 which engage a spring pressed pawl 25 mounted on the base member in close proximity to the electro-magnet 13, the purpose of which will hereinafter appear. Stops 35 and 36 also limit the movement of the plate 15. Rotatably mounted on the pin 14 and resting on the upper side of the plate 15 is a member 26 beveled at one end as shown at 27. Rotatably mounted on the upper end of the pin 14 is an operating member 28 having a downwardly projecting portion 29 which is adapted to engage lugs 30 or 31 on the member 26 to actuate the same. As seen in Fig. 1, one end of the member 26 projects under an arm or strap 32 and one end of the strap 32 lies under the head of the contact 16, and its opposite end is secured to a post 16' on the plate 15. The contact 16 is slidably mounted in the plate 15 and is normally pressed downwardly by the spring arm 21. The arm 32 is inclined downwardly, as shown at 32', and a portion 33 is cut and bent out therefrom as most clearly shown in Fig. 10.

Figure 3:
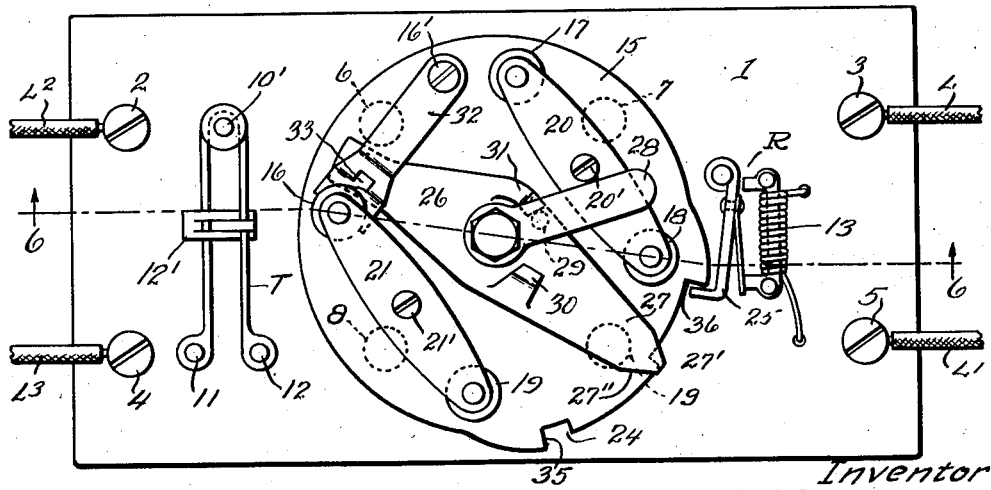
Figs. 3, 4 and 5 are views similar to Fig. 1 with the handle in different positions.
Figure 4:
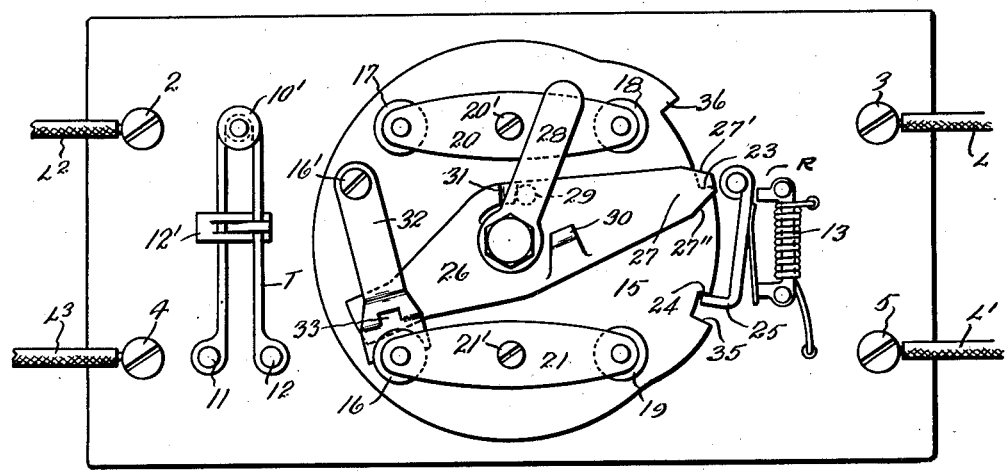
Figure 5:
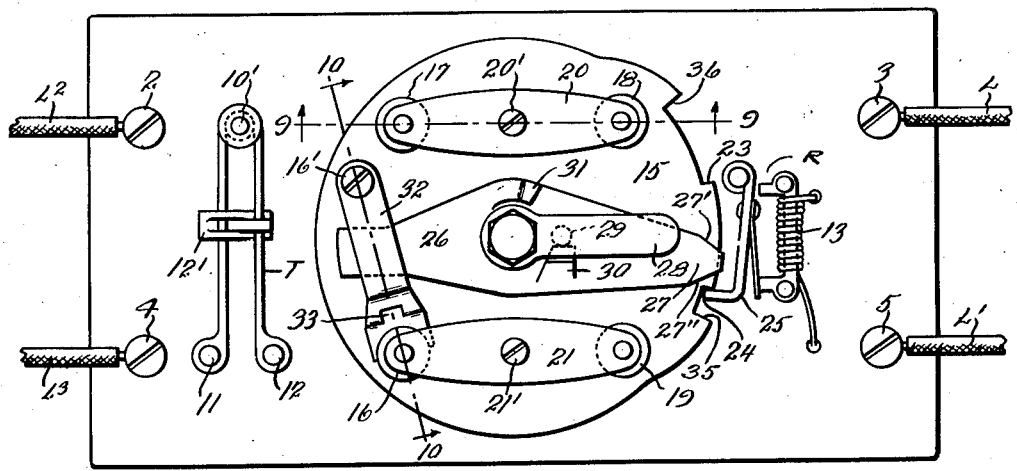
Figure 9:
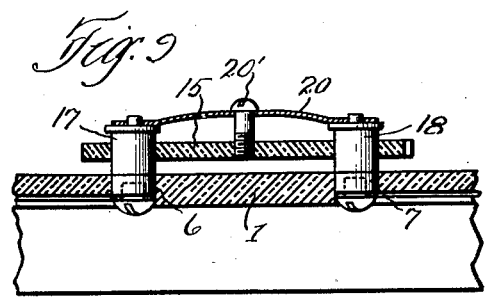
Fig. 9 is a sectional view on the line 9—9 of Fig. 5.

The base member 1 has a raised portion formed thereon to provide an incline 34, and so located that when the plate 15 is in the "off" position as in Fig. 1, the contact 16 will be over the raised portion 34 thereby bringing the contact 16 into an elevated position which also raises one end of the arm 32 with its projection 33 sufficient to allow the end of the member 26 to pass under the projection 33 when turning the member 28 anti-clockwise and engage the contact 16 (see Fig. 3). The opposite end 27 of member 26 is then so located that the bevel 27' covers stop 23 and further movement of member 26 will turn plate 15 and latch 25 will be moved outwardly by the bevel edge 27', and as the movement of the member 26 continues, the latch will ride on the periphery of the plate 15 until the stop 24 is passed, whereupon the latch 25 will enter the recess and the plate 15 will be held against further rotation by the stop 35 and against return rotation by the stop 24 engaging the latch 25. In this position, the switch will be in the "on" position (see Fig. 4) and the contacts 17, 18 and 19 are in electrical contact with their associated contacts 6, 7 and 9. Contact 16 is being held by member 26 and arm 32 in an elevated position over its associated contact 8. The handle 28 may now be turned in the opposite direction until projection 29 of the handle comes against lug 30 of the member 26, and further movement of the handle will move member 26 and member 26 will release the contact 16 from its elevated position through disengagement with the projection 33 of arm 32. The contact 16 will automatically move into electrical contact with its associated contact 8, this being the "on" position of the device as shown in Fig. 5. Therefore, due to free movement of the member 28 from the time that its projection 29 leaves lug 31 on member 26 and until it comes into engagement with lug 30 and member 26 is rotated sufficient to allow contact 16 to engage with contact 8 and close the circuit, that during this time should excess current flow through the electro-magnet 13, latch 25 will be withdrawn, thereby releasing plate 15 before the handle has been released, and under the influence of the spring 22 the plate 15 will rotate into the "off" position irrespective of the handle. By moving the member 28 still farther in a clockwise direction the bevel 27" of member 26 will push the latch 25 out of engagement with stop 24 and the spring 22 will return the plate 15 and contacts to its original position, as shown in Fig. 1. The inclined portion of 32 is so positioned that the member 26 can pass under projection 33 only when the plate is in the "off" position and contact 16 is in the elevated position, as shown in Fig. 3.

The reference characters L and L' designate the conductors from the main line and $L^2$ and $L^3$ designate the corresponding conductors leading from the switch, and may connect to an electric motor for operating a washing machine or other device. The contacts 16, 17, 18 and 19 are slidably mounted in the plate 15 and arms 20 and 21 are tensioned by means of screws 20' and 21' so that the contacts are urged into frictional engagement with the plate 15. It will now be clear that when the plate 15 is turned to the "on" position shown in Figs. 4 and 5 that the contact posts 6 and 7 will be connected by the conductor plate 20 and the contact posts 8 and 9 will be connected by the conductor plate 21, and that the circuit will be completed through the switch and that in all other positions of the plate 15 the complete circuit will be broken at four points.

A bi-metal U-shaped thermostatic device T which is placed in and forms a part of the circuit $L'$—$L^3$ and connected at post 11 and 12, Fig. 7, and the bight or intermediate portion is provided with a carbon contact plate 10' and free to move, and which is adapted to engage with contact post 10 on the opposite side of the line or circuit L—$L^2$. The thermostatic element T is so positioned that an increase in temperature therein due to the current flowing therein deflects its free end with its contact plate 10' towards contact post 10, and when the temperature of the thermostatic device reaches a predetermined value the plate 10' will contact with the post 10 and electrically connect line L with L' if the switch is closed. The combined current value and time at which this thermostatic device T will engage with post 10 may be varied and regulated by means of a slider 12' adjustably mounted on the thermostatic device T, thereby cutting in or out a greater or lesser portion of the thermostatic device T, thereby permitting more or less deflection of the thermostatic device T for a given current. In other words the moving of the slider 12' toward the posts 11—12 will for a given current and time permit less deflection of the plate 10' than if the slider were moved toward the plate 10'.

The latch 25 is operated by a coil and magnet 13 and which is so positioned as to exert a pull on the latch 25 to withdraw the same from engagement with the stop 24 when a current of predetermined value traverses the coil, and this coil is connected in the circuit $L'$—$L^3$ between the contact 9 and the post 5.

When the switch is closed the plate 15 is brought to the position shown in Fig. 5 and is held in this position by the engagement of the latch 25 in the stop 24. Thus is formed a circuit consisting of the conductor L, one side of the plate 15 and its contacts, the conductor $L^2$, the translating device M, the conductor $L^3$, the thermostatic device T, through the opposite side of the plate 15 and its contacts, the coil 13 and the conductor L'.

The thermostatic device T depends upon the heating effect thereon of the current flowing through the device for its operation.

Having my device connected to a source of power and to a translating device M, such as a motor, and it is desired to start the motor, the operator will move the handle 28 in an anti-clock-wise direction as far as possible, that is until the latch 25 drops into the notch and engages the stop 35. Then the handle is moved in a clock-wise direction and the member 26 disengages the member 33 and the plug contact 16 springs into engagement with the contact 8, thus completing the circuit from the source of power to the motor.

If for any reason there is a load on the motor and the rush of current is in excess of that which the electro-magnet 13 is set for, then the latch 25 will immediately release the plate 15 and the plate will rotate in a clock-wise direction and open the circuit under a quick-break action.

If the load on the motor M at starting is heavy but not in excess of that required to operate the latch 25, then if the heavy load "hangs on" for a time tending to endanger the motor to over heating, then the thermostatic device will operate and the contact plate 10' will contact with the post 10 and this will connect the two sides of the supply circuit together and there will be a rush of current for an instant which will energize the electro-magnet 13 sufficient to trip the latch 25 and thus release the rotary switch and open the circuit. The "shorting" of the lines L—L' will be for an instant only and the current flowing will be broken at four contacts. It will be noted that when the thermostatic device T shorts the circuits that the coil of the electro-magnet 13 is, in effect, thrown across the power line or the thermostatic device T connects one side of the coil or the electro-magnet 13 to the power conductor L, the other side of the coil being connected to the power conductor L'.

If after the motor has been operating for a time, the load should gradually increase to a point where the heating endangered the insulation, then the thermostatic device T would automatically operate as already described, and the electro-magnet would trip the latch 25 and the circuit would be opened or if the motor should "stall" the sudden rush of current would over-energize the electromagnet 13 and trip the latch 25 instantly and the circuit would be opened.

It is well to enclose the thermostatic device T so that the temperature coefficient will be more nearly constant and conform more nearly with that of the translating device.

It will be apparent that the electro-magnet 13 operates instantly on a current flow in excess of a predetermined amount and the thermostatic device T operates after a current of a predetermined value has been flowing for a predetermined time, but such current is of lower value than the previous mentioned current value.

The electro-magnet 13 operates the latch 25 independently of the thermostatic device T to release the plate 15 and the thermostatic device T acts independently of the electro-magnet 13, but controls the operation of the electro-magnet 13 for a predetermined current flowing for a predetermined time. The switch-plate 15 is, therefore, automatically operated to an open position under two conditions, either by a gradual increase in current until a predetermined heating is reached as measured by the thermostatic device T or by a surge of current in excess of a predetermined value. There is independence of action between the thermostatic device T and the electro-magnet 13, and there is also co-operation as described.

Having thus described my invention, what I claim is:—

1. A circuit breaker comprising in combination a base member upon which are mounted and held in fixed position a plurality of pairs of contact members, conductors connected to said members, a plurality of bridging members to engage and connect the contact members of a given pair, means to manually actuate the bridging members to either a closed or an open position, electrically operated means connected in series with one of said pairs of contacts to hold the bridging members in closed position relative to the contact members under normal conditions and to release said hold when current in the conductors exceeds a predetermined value, means to maintain one of the bridging members out of engagement with its contact member until the manually operated means is reversed and means having a time lag operating to electrically connect one contact of each pair of contacts to effect the release of the holding means at a current value less than the said predetermined current value.

2. A circuit breaker comprising circuit making and breaking means to control an outgoing and return circuit connected thereto, an electro-responsive device to lock the said means in closed position and control the opening of the said means at a predetermined current value in said circuit, a U-shaped bimetallic thermo-responsive device connected in series with said circuit and affected by the current in the said circuit of a lower value than that affecting the electro-responsive device to control the electro-responsive device, the electro-responsive and the thermo-responsive devices connected in series and carrying the same current at all times but independent in operation as described, the thermo-responsive device arranged to short circuit the two circuits to increase the current therein momentarily.

3. A circuit breaker comprising a base member upon which are mounted, circuit making and breaking means to control a plurality of circuits connected thereto, an electro-responsive device to hold the said means closed and to automatically release the said means at a predetermined current value and connected in series with one of the circuits and a thermo-responsive element connected in series with one of the circuits and affected by the current flowing in the said circuit to raise the temperature of the thermo-responsive element and connect the two circuits together after a predetermined lapse of time and raise the current through the electro-responsive element up to or in excess of the said predetermined current value to operate the electro-responsive element.

4. A circuit breaker comprising circuit making and breaking means to control a plurality of circuits connected thereto, an electro-responsive device provided with a movable armature to hold the said means closed and to automatically release the said means at a predetermined current value and connected in series with one of the circuits and a thermo-responsive element normally connected in series with and affected by the current in one of the circuits and arranged to connect the electro-responsive device to one of the other circuits also when the current flowing through the thermo-responsive element raises the temperature thereof above a predetermined amount.

5. A thermally controlled circuit breaker comprising circuit closing and opening switch to control the two circuits from a source of power, electromagnetically operated means to hold said switch closed and to release same when the current in one of the circuits reaches a predetermined value and a thermo-responsive element connected in series in one of the circuits to be affected by the current therein, a contact connected to the other circuit, the thermo-responsive means arranged to engage the contact and connect the electromagnetically operated means across the circuits to raise the current in said means to the predetermined tripping value when the current in the thermo-responsive element has reached a predetermined value for a predetermined time.

6. A current supply system for a motor comprising a conductor circuit connected with said motor, a switch in said circuit biased to open said circuit, a trip for holding said switch closed, an electromagnet in said circuit arranged to release said trip when abnormal current exceeding a predetermined value passes through said circuit, a thermo-responsive element connected with said circuit and actuated by heat generated by current passing through said element to short said circuit across said motor when an overload current exceeding a predetermined value, less than that required to release said trip, passes through said circuit for a predetermined period of time, said electromagnet, trip and switch having an operating time, when released by abnormal current, less than is required for said thermo-responsive device to short said circuit so that said switch responds to abnormal current independently of said thermo-responsive device.

7. In a current supply system for a motor, a conductor circuit connected with said motor, a switch in said circuit, a spring normally tending to open said switch, a catch for holding said switch in closed position, an electromagnet in series with said circuit for releasing said catch and permitting said switch to open, a thermo-responsive element in series with said switch, electromagnet and motor, and having contacts for shorting said circuit across said motor, said thermo-responsive element being operable to short said motor by continued overload current less than that required to effect the opening of said switch by said electromagnet and catch, said switch being operable under abnormal current to open said circuit in less time than is required to effect shorting of said motor by said thermo-responsive element.

In testimony whereof I affix my signature.

EDGAR D. MOORE.